(12) United States Patent
Dogu et al.

(10) Patent No.: US 12,039,064 B2
(45) Date of Patent: Jul. 16, 2024

(54) INFORMATION PROCESSING DEVICE, INFORMATION PROCESSING METHOD, INFORMATION PROCESSING PROGRAM, AND INFORMATION PROCESSING SYSTEM

(71) Applicant: DIGITAL ARTS INC., Tokyo (JP)

(72) Inventors: Toshio Dogu, Tokyo (JP); Takuya Matsumoto, Tokyo (JP); Kiyoto Inomata, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 780 days.

(21) Appl. No.: 15/734,982

(22) PCT Filed: Jun. 4, 2019

(86) PCT No.: PCT/JP2019/022067
§ 371 (c)(1),
(2) Date: Mar. 23, 2021

(87) PCT Pub. No.: WO2019/235450
PCT Pub. Date: Dec. 12, 2019

(65) Prior Publication Data
US 2021/0209240 A1    Jul. 8, 2021

(30) Foreign Application Priority Data

Jun. 5, 2018   (JP) .................. 2018-108158

(51) Int. Cl.
*G06F 21/62*      (2013.01)
*G06F 21/55*      (2013.01)

(52) U.S. Cl.
CPC .......... *G06F 21/6218* (2013.01); *G06F 21/55* (2013.01); *G06F 2221/2107* (2013.01); *G06F 2221/2141* (2013.01)

(58) Field of Classification Search
CPC ................ G06F 21/6218; G06F 21/55; G06F 2221/2107; G06F 2221/2141; G06F 21/64;
(Continued)

(56) References Cited

U.S. PATENT DOCUMENTS 9,736,140 B1 *  8/2017  Wu ....................... G06F 21/44
2003/0084299 A1   5/2003  Tamura et al.
(Continued)

FOREIGN PATENT DOCUMENTS

CN      1607484 A      4/2005
CN      1642113 A      7/2005
(Continued)

OTHER PUBLICATIONS

International Search Report in the international application No. PCT/JP2019/022067, mailed on Aug. 27, 2019, and its English translation provided by WIPO.
(Continued)

*Primary Examiner* — Techane Gergiso
(74) *Attorney, Agent, or Firm* — Ladas & Parry, LLP

(57) ABSTRACT

An information processing device 10 includes: a database 12 that stores contents created by an administrator terminal 13; and a control device 11 that stores the contents and the administrator terminal 13 that are associated with each other as association information, and executes setting an access right to the contents on the basis of this association information.

5 Claims, 13 Drawing Sheets

(58) Field of Classification Search
CPC ............. H04L 63/0428; H04L 63/0876; H04L 63/101; H04L 63/102
See application file for complete search history.

(56) References Cited

U.S. PATENT DOCUMENTS

| | | | |
|---|---|---|---|
| 2003/0105950 A1* | 6/2003 | Hirano | G06F 21/6218 713/100 |
| 2004/0236828 A1 | 11/2004 | Igeta | |
| 2005/0086447 A1* | 4/2005 | Miyamoto | G06F 21/6218 711/163 |
| 2005/0160295 A1* | 7/2005 | Sumi | H04L 63/1416 709/224 |
| 2006/0277185 A1* | 12/2006 | Sato | H04W 12/02 707/999.009 |
| 2007/0260643 A1* | 11/2007 | Borden | G06F 21/10 |
| 2008/0189363 A1* | 8/2008 | Tian | H04L 69/24 709/221 |
| 2011/0224509 A1 | 9/2011 | Fish et al. | |
| 2011/0276713 A1 | 11/2011 | Brand | |
| 2012/0033807 A1 | 2/2012 | Asim et al. | |
| 2016/0191535 A1 | 6/2016 | Zeng et al. | |
| 2016/0315941 A1* | 10/2016 | Dang | G06F 21/62 |
| 2018/0139085 A1 | 5/2018 | Koorapati et al. | |
| 2018/0285583 A1* | 10/2018 | Dogu | H04L 9/0894 |

FOREIGN PATENT DOCUMENTS

| | | |
|---|---|---|
| CN | 101313549 B | 7/2012 |
| JP | 2000222264 A | 8/2000 |
| JP | 2003140970 A | 5/2003 |
| JP | 2005004728 A | 1/2005 |
| JP | 2005011061 A | 1/2005 |
| JP | 2005202688 A | 7/2005 |
| JP | 2009282757 A | 12/2009 |
| JP | 2011249946 A | 12/2011 |
| JP | 6082130 B1 | 2/2017 |
| TW | 200535746 A | 11/2005 |
| TW | 201614543 A | 4/2016 |

OTHER PUBLICATIONS

Written Opinion of the international application No. PCT/JP2019/022067, mailed on Aug. 19, 2019 and its English translation provided by Google Translate.

Office Action for Taiwanese Patent Application 108119247 issued on Jun. 6, 2022, and its English Translation provided by Google Translate.

First Office Action from TW app. No. 108119247, dated Nov. 20, 2020, with machine English translation.

Written Opinion of the International Searching Authority from PCT/JP2019/022067, dated Aug. 27, 2019, with English translation provided by WIPO.

International Preliminary Report on Patentability from PCT/JP2019/022067, dated Dec. 8, 2020, with English translation provided by WIPO.

Partial Supplementary European Search Report from EP app. No. 19814241.6, dated Jan. 26, 2022, all pages.

Office action and search report from corresponding Chinese Patent Application No. 201980047261.X dated Sep. 22, 2023, and its English translation from Global Dossier.

* cited by examiner

FIG. 3

| ADMINISTRATOR TERMINAL (IDENTIFICATION INFORMATION) | CORRESPONDING CONTENTS |
|---|---|
| AA-AA-xx-xx-x1 | aaa.html |
| AA-AA-xx-xx-x1 | bbb.html |
| AA-AA-xx-xx-x2 | ccc.html |
| AA-AA-xx-xx-x2 | aaa.html |
| . . . | . . . |

FIG. 9

| ADMINISTRATOR TERMINAL (IDENTIFICATION INFORMATION) | CORRESPONDING CONTENTS DATA (ENCRYPTED DATA) | ACCESS RIGHT |
|---|---|---|
| AA-AA-xx-xx-x1 | aaa.html.xxx | PERMITTED |
| AA-AA-xx-xx-x1 | bbb.html.yyy | PERMITTED |
| AA-AA-xx-xx-x2 | ccc.html.zzz | PERMITTED |
| AA-AA-xx-xx-x2 | aaa.html.zzz | PERMITTED |
| ... | ... | ... |

INFORMATION PROCESSING DEVICE, INFORMATION PROCESSING METHOD, INFORMATION PROCESSING PROGRAM, AND INFORMATION PROCESSING SYSTEM

CROSS-REFERENCE TO RELATED APPLICATIONS

The present application is the U.S. national phase of PCT Application No. PCT/JP2019/022067 filed on Jun. 4, 2019 which claims the benefit of and priority to Japanese Application No. 2018-108158 filed on Jun. 5, 2018, the disclosures of which are incorporated herein by reference in their entireties.

TECHNICAL FIELD

Embodiments of the present invention relate to an information processing device, an information processing method, an information processing program, and an information processing system.

BACKGROUND ART

A web server stores contents created and updated by the administrator managing the server, and executes an operation of returning the contents in response to a request from the client terminal.

Various kinds of software including an OS are installed in the web server, and the software executes creation of contents, support of update, and communication with a client, terminal, and the like. Vulnerabilities (security weaknesses) in the software could allow a malicious third party to exploit these vulnerabilities to execute an attack to a server (e.g., SQL injection). Successful attack by the third party could allow the third party to intrude into the server, and the contents stored in the server to be intentionally rewritten.

In a conventional technology having been disclosed, in order to prevent an unauthorized intrusion into the web server by a third party, an attack pattern from an external terminal connected to the web server is registered in advance, and an unauthorized input to the server is detected on the basis of the registered attack pattern to prevent a tampering.

CITATION LIST

Patent Literature

Patent Literature 1: JP 2005-011061 A

SUMMARY OF INVENTION

Problem to be Solved by Invention

However, it is difficult to detect and cope with all the vulnerabilities of the application installed in the web server in advance, and there is a case of allowing an unauthorized intrusion into the server by a method such as an unauthorized theft of the login password to the administrator terminal. Therefore, it is not easy to prevent in advance a tampering with the contents in the server, and it has been difficult to detect the tampering at an early stage when the contents in the server are tampered.

The present invention has been made in consideration of such circumstances, and its object is to provide an information processing device, an information processing method, an information processing program, and an information processing system capable of preventing tampering with contents in the server in advance even when the web server is intruded by a third-party terminal.

Means to Solve the Problem

An information processing device according to an embodiment of the present invention is an information processing device that returns contents in response to a request from a client terminal, the information processing device comprising: a database that stores the contents created by an administrator terminal; and a control device that stores the contents and identification information for identifying the administrator terminal that are associated with each other as association information, and executes setting an access right to the contents on a basis of this association information, wherein the control device has an access right setting unit that encrypts the contents created by the administrator terminal, and sets an access right to decrypt and access the contents for the administrator terminal associated with the contents having been encrypted, and an access right check unit that determines whether or not the terminal has an access right to the contents on a basis of the access right having been set when the contents are accessed.

Effects of Invention

According to the embodiments of the present invention, an information processing device, an information processing method, an information processing program, and an information processing system capable of preventing tampering with contents in the server in advance even when the web server is intruded by a third-party terminal are provided.

BRIEF DESCRIPTION OF DRAWINGS

FIG. 3 is an explanatory view showing an example of association information in which contents are associated corresponding to an administrator terminal.

FIG. 9 is an explanatory view showing an example of association information in which an access right is granted to the administrator terminal.

EMBODIMENTS OF INVENTION

First Embodiment

Embodiments of the present invention will be described below with reference to the accompanying drawings.

Figure 1:
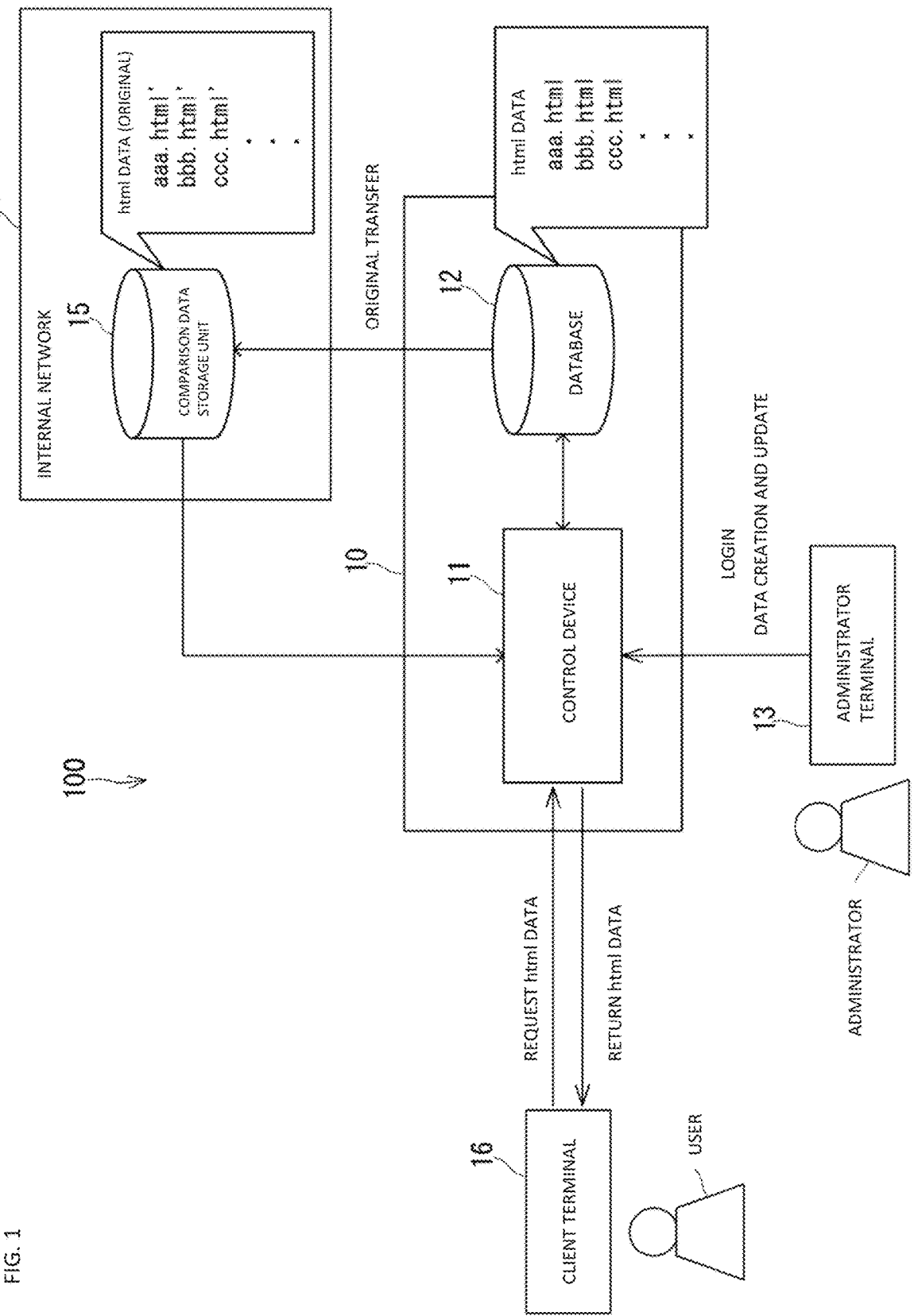
FIG. 1 is a configuration diagram showing an example of an information processing system to which an information processing device according to a first embodiment is applied.

FIG. 1 is a configuration diagram showing an example of an information processing system 100 to which an information processing device 10 according to the first embodiment is applied.

The information processing system 100 according to the first embodiment includes the information processing device 10, an administrator terminal 13, and a comparison data storage unit 15.

The information processing device 10 is a device that stores contents created and updated by the administrator terminal 13 and returns, to a client terminal 16, the contents requested from the client terminal 16. As the contents, various data such as html data, image data, and pdf files are exemplified. FIG. 1 exemplifies html data as contents.

The information processing device 10 is provided at a boundary (demilitarized zone: DMZ) between an internal network whose connection from the Internet, for example, is restricted and an external network arbitrarily connectable to the Internet. The information processing device 10 may be provided in an external network.

The client terminal 16 is a computer that is connected with the information processing device 10 via the Internet, and displays, via a browser, contents acquired from the information processing device 10.

The administrator terminal 13 is a computer connectable to the information processing device 10, and the administrator executes creation and update of contents. The administrator terminal 13 is provided in an internal network whose connection from the Internet is restricted. The administrator terminal 13 may be provided on an external network arbitrarily connectable with the Internet, or may be configured integrally with the information processing device 10.

A specific configuration of the information processing device 10 according to the first embodiment will be described. The information processing device 10 according to the first embodiment includes a control device (web server) 11 and a database 12.

The control device 11 receives the contents created and updated by the administrator terminal 13 having received login authentication. The database 12 stores the created and updated contents. It is to be noted that, the control device 11 and the database 12 may be configured integrally as shown in FIG. 1, or the control device 11 and the database 12 may be separately and independently disposed in the identical network to have a configuration in which data including contents are transmitted/received between the database 12 and the administrator terminal 13.

The control device 11 creates association information in which the created contents are associated with the administrator terminal 13 related to the creation of the contents. Then, the control device 11 executes at least one of the determination of the presence or absence of tampering with the contents and the setting of the access right to the contents by a terminal different from the administrator terminal 13 on the basis of the association information. By associating the administrator terminal 13 with the created contents, it is possible to identify update of the contents executed by the correct administrator terminal 13. It is to be noted that the specific configuration of the determination of the presence or absence of tampering with the contents and the setting of the access right to the contents will be described later.

Figure 2:
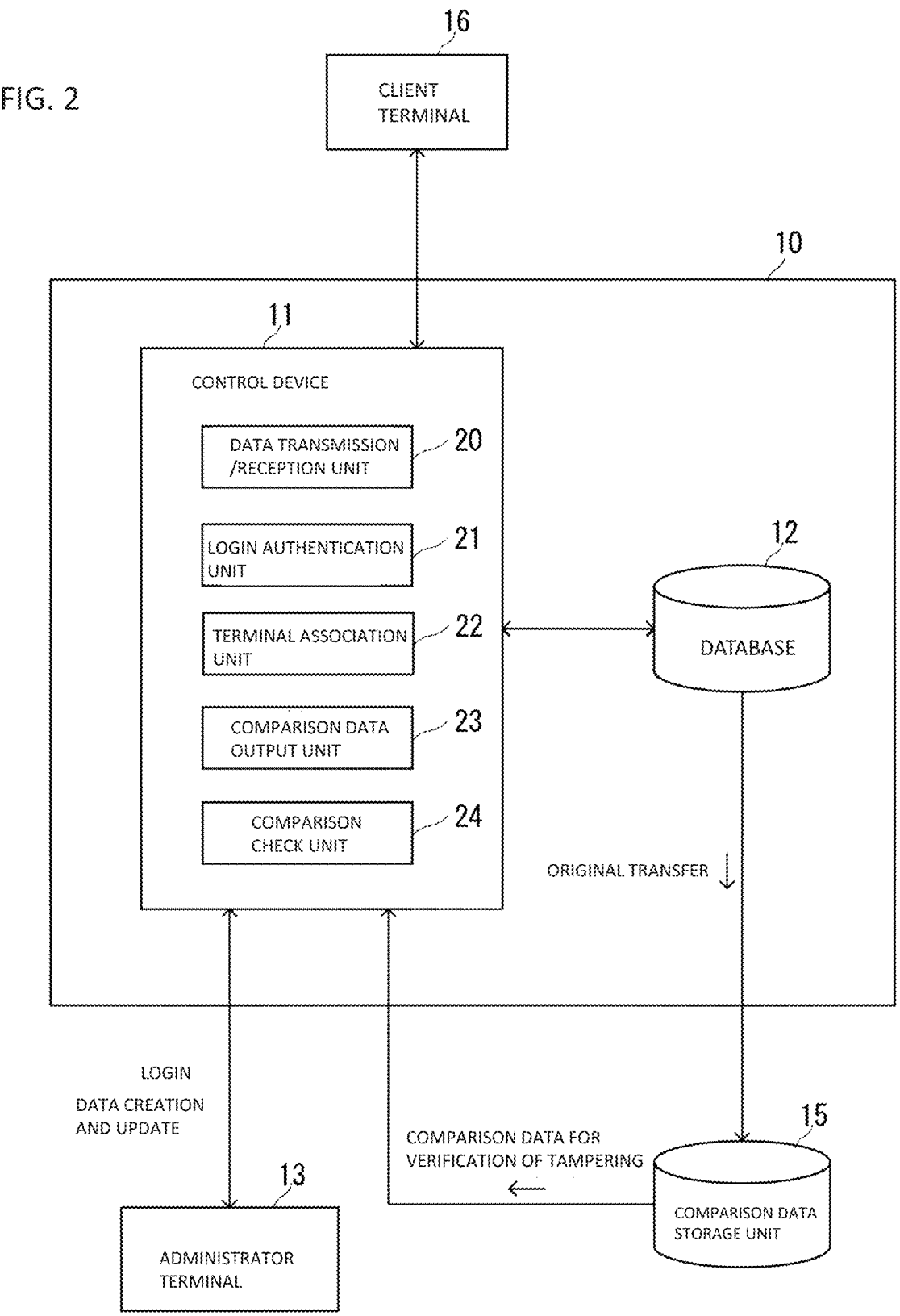
FIG. 2 is a configuration diagram showing a configuration of a control device in the information processing device according to the first embodiment.

FIG. 2 is a configuration diagram showing the configuration of the control device 11 in the information processing device 10 according to the first, embodiment.

The control device 11 has a data transmission/reception unit 20, a login authentication unit 21, a terminal association unit 22, a comparison data output unit 23, and a comparison check unit 24.

It is to be noted that the function of each unit constituting the control device 11 may be implemented by executing a predetermined program code by using a processor. Alternatively, not limited to such software processing, the function may be implemented by hardware processing using an ASIC, for example, or may be implemented by combining software processing and hardware processing.

The data transmission/reception unit 20 receives a contents request from the client terminal 16 and returns the requested contents to the client terminal 16.

The login authentication unit 21 receives an input of authentication information for login (e.g., a user ID and password) from the administrator terminal 13, and identifies the validity of the administrator's access to the control device 11. It is to be noted that the authentication information of the administrator necessary for the login authentication is stored in the database 12.

When contents are newly created by the administrator terminal 13, the terminal association unit 22 creates association information in which the contents are associated with identification information for identifying the created administrator terminal 13. The created association information is stored in the database 12.

Specifically, the terminal association unit 22 acquires, from the administrator terminal 13, identification information for identifying the administrator terminal 13 connected to the information processing device 10. The identification information is terminal-specific information, and exemplified by the MAC address of the administrator terminal 13, the serial number of the hard disk, the serial number of the implemented CPU, and the security identifier (SID) of the OS. This identification information is association information in association with the contents created by the administrator terminal 13. It is to be noted that in a case where a plurality of the administrator terminals 13 are connected to the information processing device 10, corresponding contents are associated with each of the administrator terminals 13. Furthermore, the plurality of administrator terminals 13 may be associated with the identical contents by setting from the administrator terminal 13 having created the contents.

FIG. 3 is an explanatory view showing an example of association information in which contents are associated corresponding to the administrator terminal 13.

Each html data is associated corresponding to identification information for identifying the administrator terminal 13. For example/the administrator terminal 13 whose identification information becomes "AA-AA-xx-xx-x1" is associated with two html data of "aaa.html" and "bbb.html". Thus, the contents stored in the database 12 are associated with the administrator terminal 13. In the example of FIG. 3, the administrator terminal 13 whose identification information becomes "AA-AA-xz-xx-x2" is associated with two html data of "ccc.html" and "aaa.html". That is, "aaa.html" is associated with two administrator terminals 13. Thus, identical contents may be associated with the plurality of administrator terminals 13.

The comparison data output unit 23 outputs, as comparison data, the contents created by the administrator terminal 13 to the comparison data storage unit 15 provided in an internal network 14.

The comparison data storage unit 15 is disposed in the internal network 14 where the connection from the Internet is restricted. Since it is impossible from other terminals including the administrator terminal 13 to connect to the comparison data storage unit 15 via the Internet, the comparison data in the comparison data storage unit 15 are retained without being changed. Therefore, the comparison data in the comparison data storage unit 15 has a function as original data free from a risk of being tampered.

When the contents are updated, the comparison data output unit 23 outputs the contents as comparison data to the comparison data storage unit 15 when the update by the administrator terminal 13 corresponding to the contents are confirmed on the basis of the association information created by the terminal association unit 22. At this time, contents already stored in the comparison data storage unit 15 with the same name are overwritten and stored. Thus, the original data corresponding to the update of the contents is stored in the comparison data storage unit 15.

The comparison check unit 24 compares the contents stored in the database 12 with the comparison data, and determines the presence or absence of tampering with the contents on the basis of the comparison result.

Specifically, when a contents request is made from the client terminal 16, the comparison check unit 24 acquires, from the database 12, data corresponding to the requested contents. Furthermore, comparison data corresponding to the requested contents is acquired from the comparison data storage unit 15. Then, the contents acquired from the database 12 are compared with the comparison data to check the presence or absence of change. The check may be performed by calculating a difference between the contents and the comparison data and determining the presence or absence of the difference, or may be performed by obtaining respective hash values of the contents acquired from the database 12 and the comparison data and comparing the hash values to determine the presence or absence of a change.

When comparing the contents acquired from the database 12 with the comparison data and the data do not match, the comparison check unit 24 determines that a terminal different from the administrator terminal 13 has updated the contents, i.e., the tampering has been executed. If it is determined that the tampering has been executed, the contents are not returned to the client terminal 16, and the administrator terminal 13 associated with the contents are notified of the tampering. On the other hand, when comparing both data and the data match, the comparison check unit 24 determines that it is normal and returns the contents to the client terminal 16. It is to be noted that the comparison check unit 24 may record the execution time of the comparison check each time the comparison check is executed.

It is to be noted that the comparison check by the comparison check unit 24 between the contents acquired from the database 12 and the comparison data may be executed at regular time intervals (e.g., every hour), not limited to when the client makes a contents request. In addition, by performing the comparison check at regular time intervals and recording the execution time of the check, when the tampering is detected, it is possible to narrow down when the tampering occurred on the basis of the time at which the tampering was detected and the time at which the contents were normal.

Subsequently, the operation of the information processing device 10 according to the first embodiment will be described.

Figure 4:
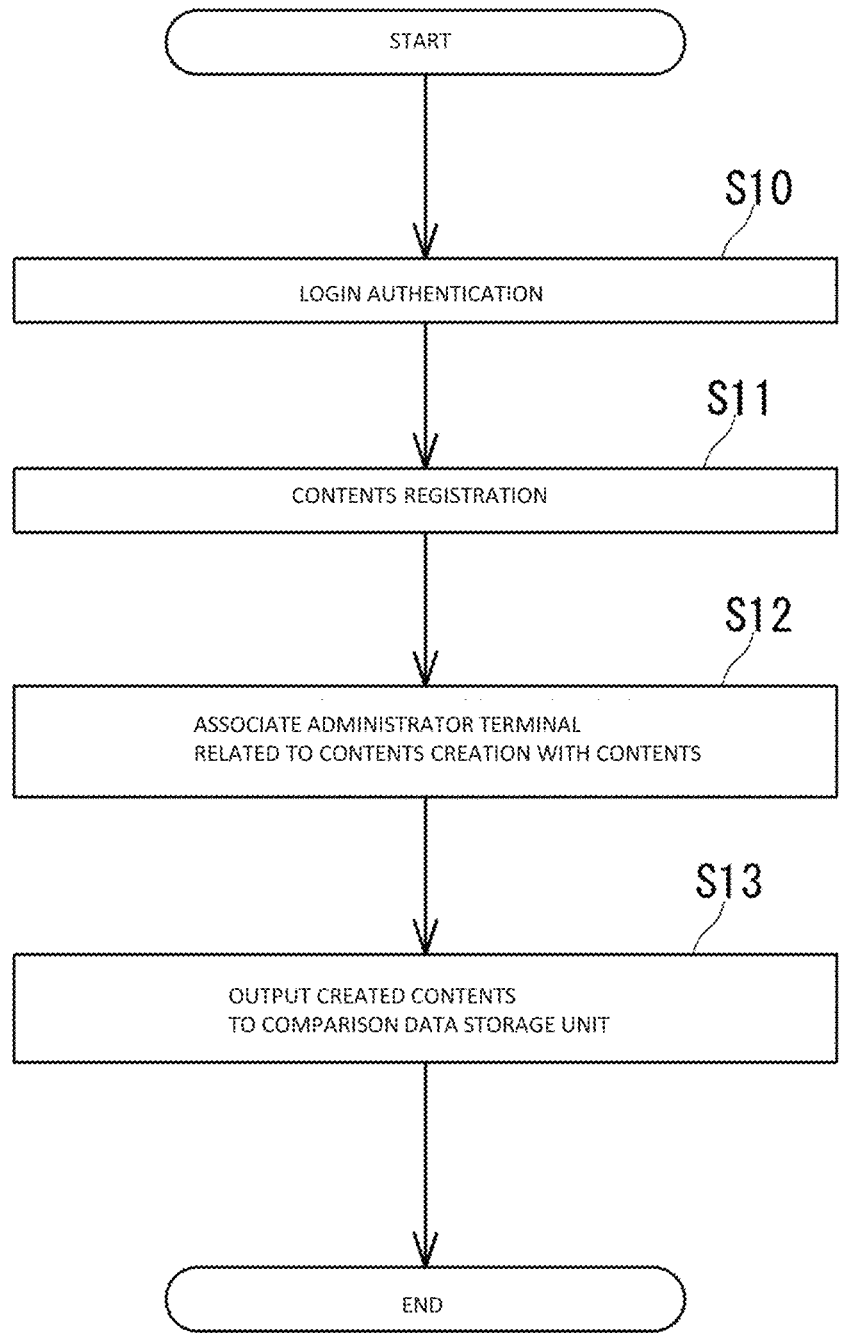
FIG. 4 is a flowchart showing an example of a flow of associating contents corresponding to the administrator terminal.

First, the flow of associating contents corresponding to the administrator terminal 13 will foe described with reference to FIG. 4 (see FIG. 2 as appropriate).

The login authentication unit 21 receives authentication information for login (e.g., a user ID and password) from the administrator terminal 13, and identifies the validity of access to the control device 11 (S10). It is to be noted that the access of the administrator terminal 13 to the control device 11 may have a configuration in which the administrator is required in advance to register the identification information (e.g., a MAC address) of the administrator terminal 13, and authentication of the access to the control device 11 is permitted only to the administrator terminal 13 having the registered identification information. Furthermore, the access of the administrator terminal 13 to the control device 11 may have a configuration in which registration of the identification information in the plurality of administrator terminals 13 is requested to the respective administrators in advance, and in a case where there is an access to the information processing device 10 from one administrator terminal 13 in which the identification information is registered, approval is required to another administrator terminal 13 in which the identification information is registered, and authentication of the access to the control device 11 is permitted when the approval is obtained.

Then, the administrator transmits the contents created in the administrator terminal 13 to the control device 11, and registers the contents in the database 12 (S11).

When contents are created in the administrator terminal 13, the terminal association unit 22 associates the contents with identification information for identifying the created administrator terminal 13, and stores it as association information (S12).

The comparison data output unit 23 outputs, as comparison data (original data), the contents created by the administrator terminal 13 to the comparison data storage unit 15 provided in the internal network 14 (S13). It is to be noted that when the contents are updated, the contents are output to the comparison data storage unit 15 as comparison data when the update by the administrator terminal 13 corresponding to the contents is confirmed on the basis of the association information created by the terminal association unit 22.

Figure 5:
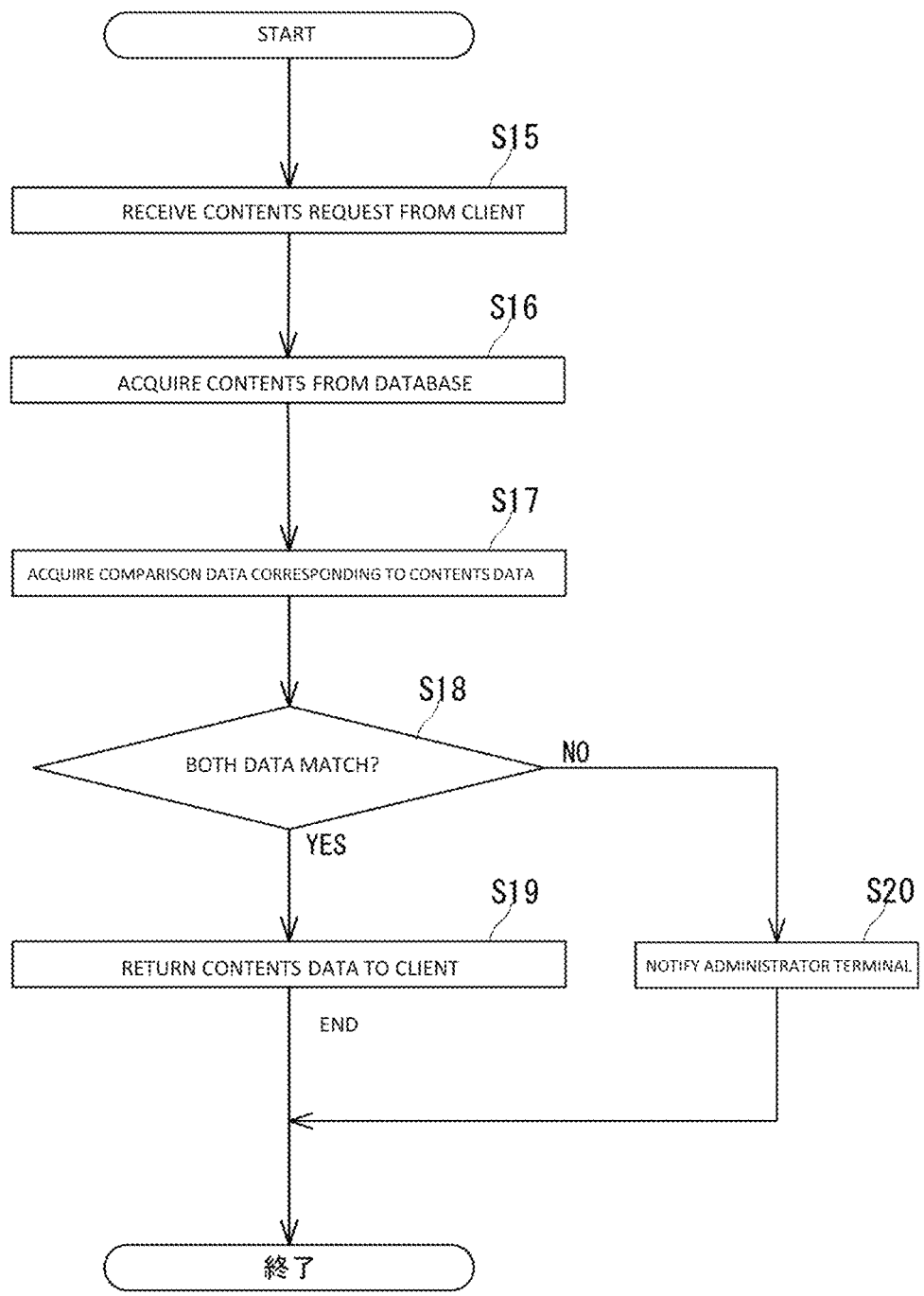
FIG. 5 is a flowchart showing an example of an information processing method according to the first embodiment.

Subsequently, a method of determining the presence or absence of tampering with contents by comparing the contents in the database 12 with the comparison data will be described with reference to the flowchart of the information processing method according to the first embodiment shown in FIG. 5 (see FIG. 2 as appropriate).

The data transmission/reception unit 20 of the information processing device 10 receives a contents request from the client terminal 16 (S15).

The comparison check unit 24 acquires contents from the database 12 (S16). Furthermore, the comparison check unit 24 acquires comparison data corresponding to the contents (comparison data in which the contents and the file name match) from the comparison data storage unit 15 (S17).

When the contents acquired from the database 12 match, the comparison data, the comparison check unit 24 determines that there is no update of the contents by a terminal different from the administrator terminal 13 and returns the contents to the client terminal 16 (S18: YES, S19). On the other hand, if the both data do not match, the comparison check unit 24 determines that tampering has occurred, does not return the contents to the client terminal 16, and notifies the administrator terminal 13 (S18: NO, S20).

By creating the association information in which the created contents and the administrator terminal 13 related to the creation of the contents are associated with each other, and comparing the original data of the contents created and updated by the administrator terminal 13 with the contents in the database 12, it is possible to detect the tampering act to the contents in the information processing device at an early stage even in a case of intrusion from a third-party terminal to the information processing device 10.

It is to be noted that in the first embodiment, the control device 11 of the information processing device 10 is configured to create association information in which the created contents and the administrator terminal 13 related to the creation of the content are associated with each other. However, the administrator terminal 13 that creates the contents may be configured to create association information in which the contents and the identification information of the administrator terminal 13 related to the creation of the contents are associated with each other, and transmit the created association information to the control device 11.

In a case where the contents are not updated by the administrator terminal 13, the presence or absence of tampering with the contents can be detected by comparing the contents created by the administrator terminal 13 and stored in the database 12 with the original data of the contents without creating association information in which the contents are associated with the administrator terminal 13 related to the creation of the contents. That is, the comparison data storage unit 15 stores the created contents as comparison data (original data), and it is possible to determine the presence or absence of tampering with the contents by comparing the comparison data with the contents stored in the database 12.

Figure 6:
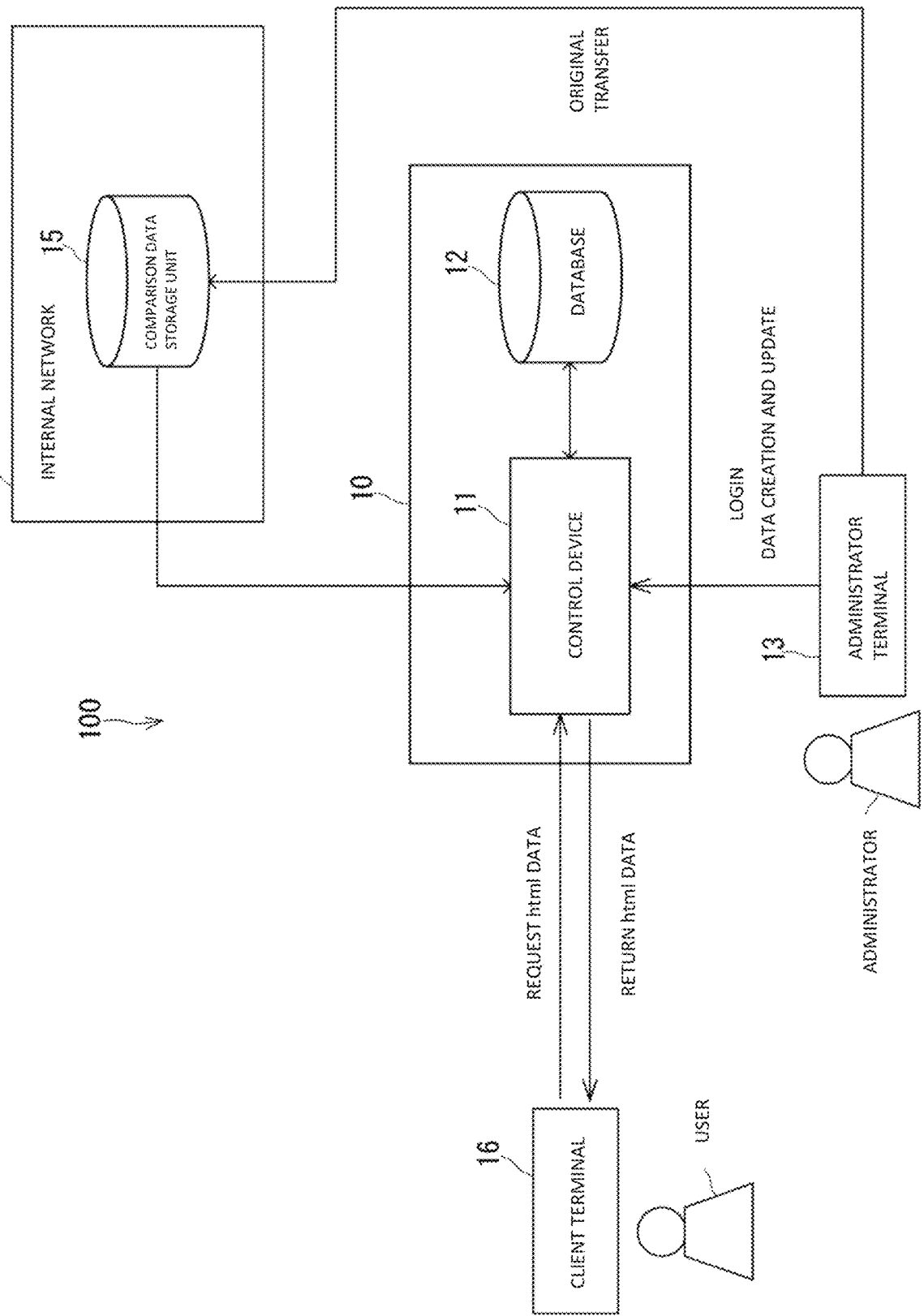
FIG. 6 is a configuration diagram showing an example of a network to which a variation of the information processing device according to the first embodiment is applied.

FIG. 6 shows a configuration diagram showing an example of a network to which a variation of the information processing device 10 according to the first, embodiment is applied, in this variation, the contents created or updated by the administrator terminal 13 are directly transferred to the comparison data storage unit 15 and stored as comparison data (original data) in the comparison data storage unit 15.

Then, the control device 11 compares the contents stored in the database 12 with the comparison data, and determines the presence or absence of tampering with the contents on the basis of the comparison result. Thus, it is possible to detect tampering with the contents in the information processing device by directly storing the contents created by the administrator terminal 13 as original data in the comparison data storage unit 15 and comparing the contents with the contents stored in the database 12.

Second Embodiment

Figure 7:
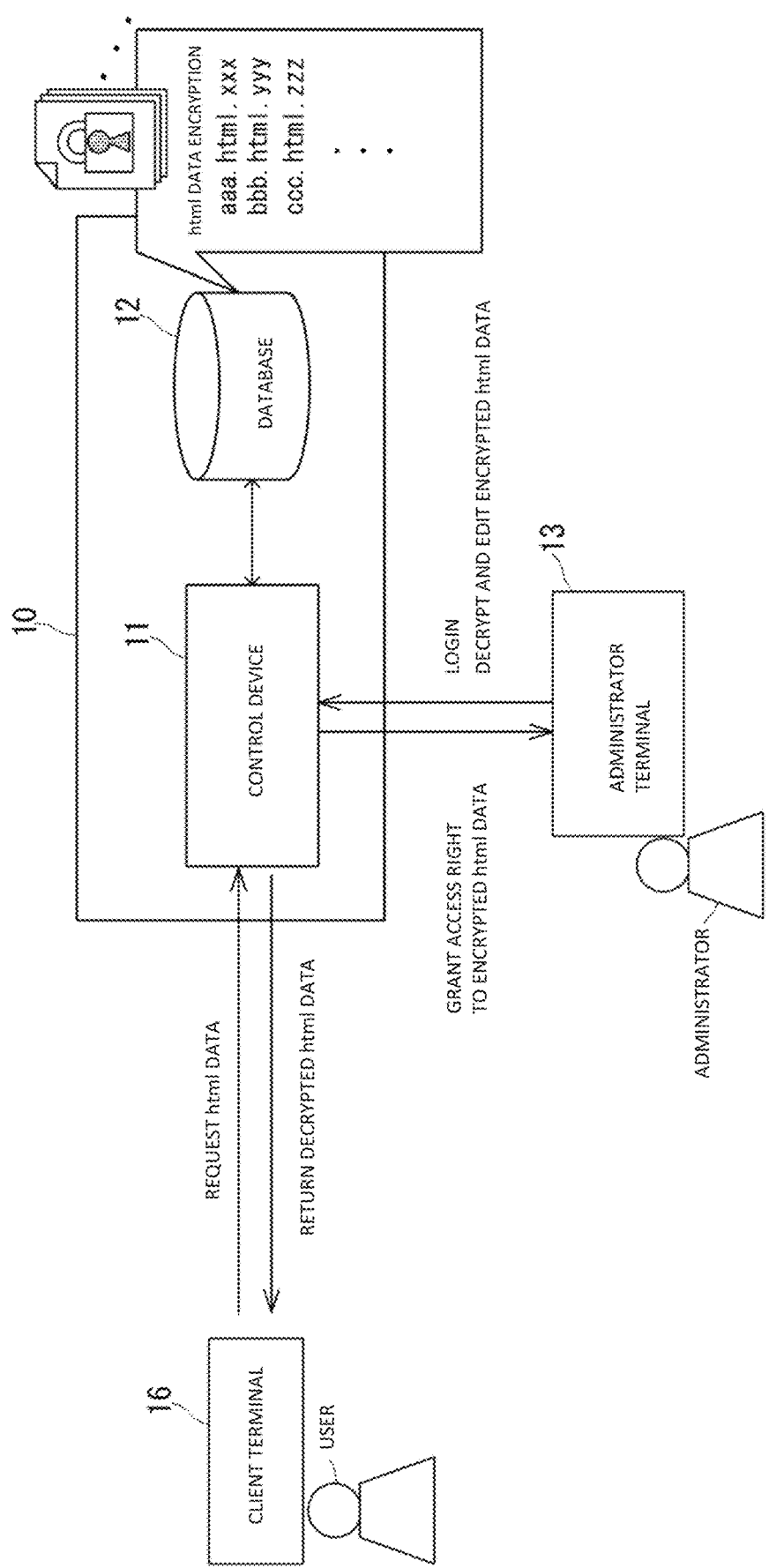
FIG. 7 is a configuration diagram showing an example of an information processing system to which the information processing device according to a second embodiment is applied.

FIG. 7 is a configuration diagram showing an example of the information processing system 100 to which the information processing device 10 according to the second embodiment is applied. In the first embodiment, the presence or absence of tampering with the contents is determined by storing the original data of the contents created and updated by the administrator terminal 13 and comparing the original data with the contents in the database 12. In the second embodiment, on the other hand, tampering with the contents is prevented by encrypting the contents stored in the database 12 and granting the access right to the administrator terminal 13 associated with the contents.

Figure 8:
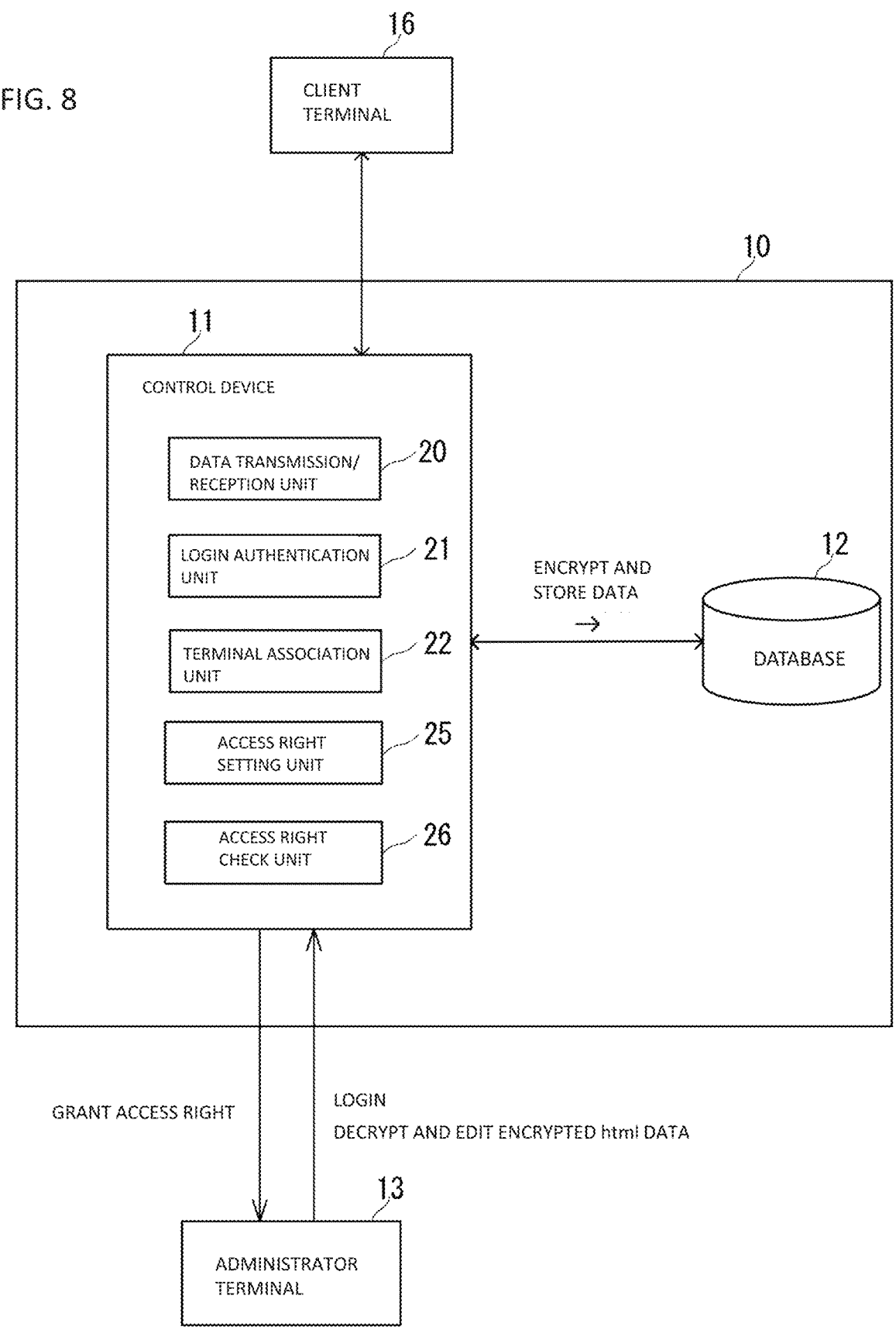
FIG. 8 is a configuration diagram showing a configuration of the control device in the information processing device according to the second embodiment.

FIG. 8 is a configuration diagram showing the configuration of the control device 11 in the information processing device 10 according to the second embodiment. It is to be noted that in FIG. 8, some of the configurations of the comparison data output unit 23, the comparison check unit 24, and the like shown in the first embodiment are omitted, but these configurations may be combined.

The control device 11 of the information processing device 10 according to the second embodiment has an access right setting unit 25 and an access right check unit 16. It is to be noted that in FIG. 8, parts having the same configuration or function as those of the first embodiment (FIG. 2) are indicated by the identical reference numerals, and the description thereof is omitted.

When contents are newly created by the administrator terminal 13, the terminal association unit 22 creates association information by associating the contents with identification information for identifying the created administrator terminal 13.

The access right setting unit 25 encrypts the contents and stores the encrypted contents in the database 12. Then, the access right setting unit 25 sets the access right for the administrator terminal 13 associated with the encrypted contents to decrypt, and access the contents. The access right means the right to control a file such as browsing, editing (change contents), and deleting contents. Thus, the contents are set to be accessible only to the specific administrator terminal 13. Furthermore, a plurality of the administrator terminals 13 may be associated with one content, and the access right may be set to each of the administrator terminals 13. This access right is set via the administrator terminal 13 of the administrator who created the contents.

FIG. 9 is an explanatory view showing an example of association information in which an access right is granted to the administrator terminal 13.

Each encrypted html data is associated corresponding to identification information for identifying the administrator terminal 13. The access right for decrypting and accessing html data is set in the administrator terminal 13. For example, the administrator terminal 13 whose identification information becomes "AA-AA-xx-xx-x1" is associated with two encrypted html data of "aaa.html.xxx" and "bbb.html.xxx". The administrator terminal 13 has the right to decrypt and access the two html data. Thus, the encrypted contents stored in the database 12 are associated with the administrator terminal 13 having the access right. In the example of FIG. 9, the administrator terminal 13 whose identification information becomes "AA-AA-xx-xx-x2" is associated with two encrypted html data of "ccc.html.xxx" and "aaa.html.xxx". That is, the two administrator terminals 13 have. the right to decrypt and access "aaa.html.xxx". Thus, identical contents may be associated with the plurality of administrator terminals 13 having the access right.

The access right check unit 26 determines whether or not the terminal has an access right to the contents on the basis of the set access right when the contents are accessed from the terminal. When contents are accessed (e.g., action of opening the contents) from the administrator terminal 13 corresponding to the contents, the administrator terminal 13 has the access right, and hence the contents are decrypted and opened. On the other hand, when contents are accessed from a terminal different from the administrator terminal 13, the terminal does not have the access right, and hence the contents are not decrypted and the file is not opened.

Thus, only the administrator terminal 13 associated with the contents and having the access right can access the contents.

The access right set by the access right setting unit 25 may be set for each file of the contents created by the administrator terminal 13 or may be set for each folder in which the file is stored. By granting an access right for each folder, it is possible to set an access right for a plurality of files collectively.

When the client terminal 16 requests contents, the data transmission/reception unit 20 decrypts the contents and returns the contents to the client terminal. It is to be noted that contents remaining encrypted may be returned to the client and decrypted on the client terminal side.

Subsequently, the operation of the information processing device 10 according to the second embodiment will be described.

Figure 10:
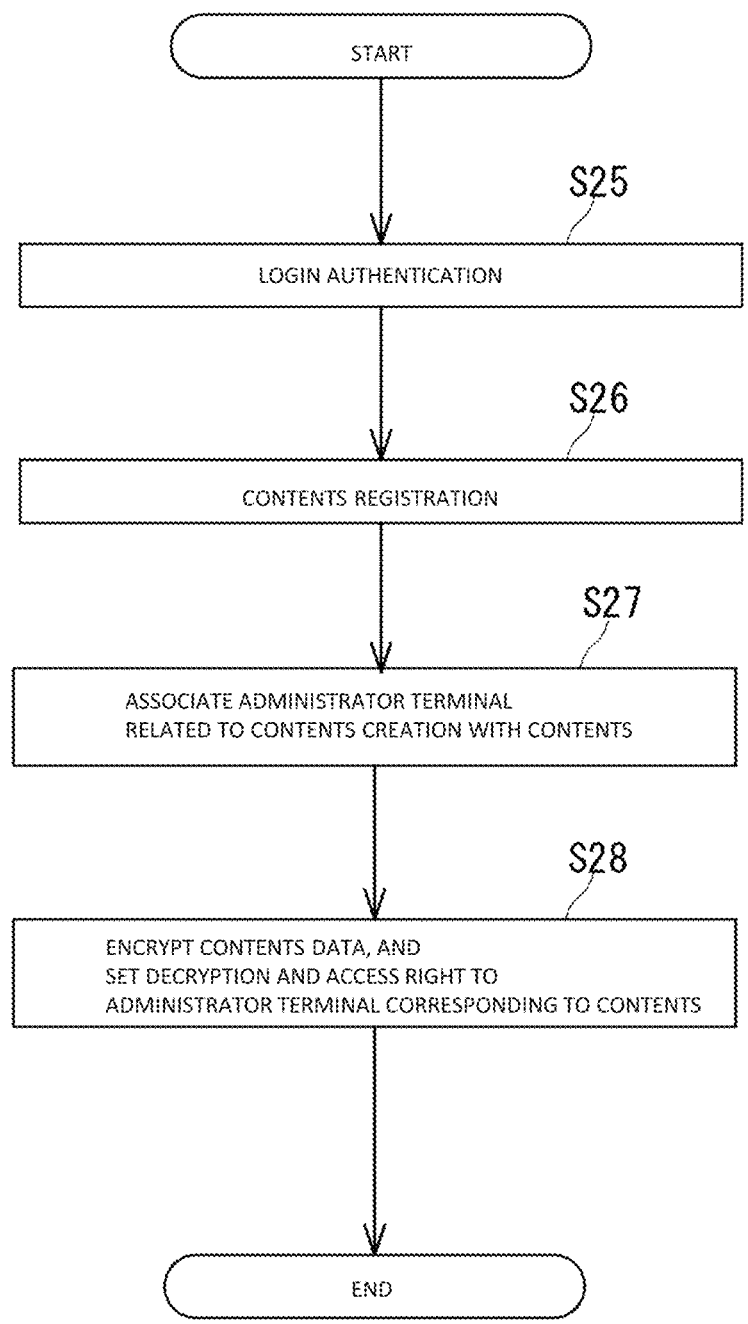
FIG. 10 is a flowchart showing an example of a flow of granting an access right corresponding to the administrator terminal.

FIG. 10 is a flowchart showing an example of the flow of granting an access right corresponding to the administrator terminal 13 (see FIG. 7 as appropriate).

The login authentication unit 21 receives the input of authentication information for login from the administrator terminal 13, and identifies the validity of access to the control device 11 (server) (S25). Then, the administrator transmits the contents created in the administrator terminal 13 to the control device 11, and registers the contents in the database 12 (S26).

When contents are created in the administrator terminal 13, the terminal association unit 22 associates the contents with identification information for identifying the created administrator terminal 13, and creates association information (S27).

The access right setting unit 25 encrypts the contents and stores the contents in the database 12. The access right setting unit 25 sets the access right for the administrator terminal 13 associated with the encrypted contents to decrypt and access the contents (S28).

Figure 11:
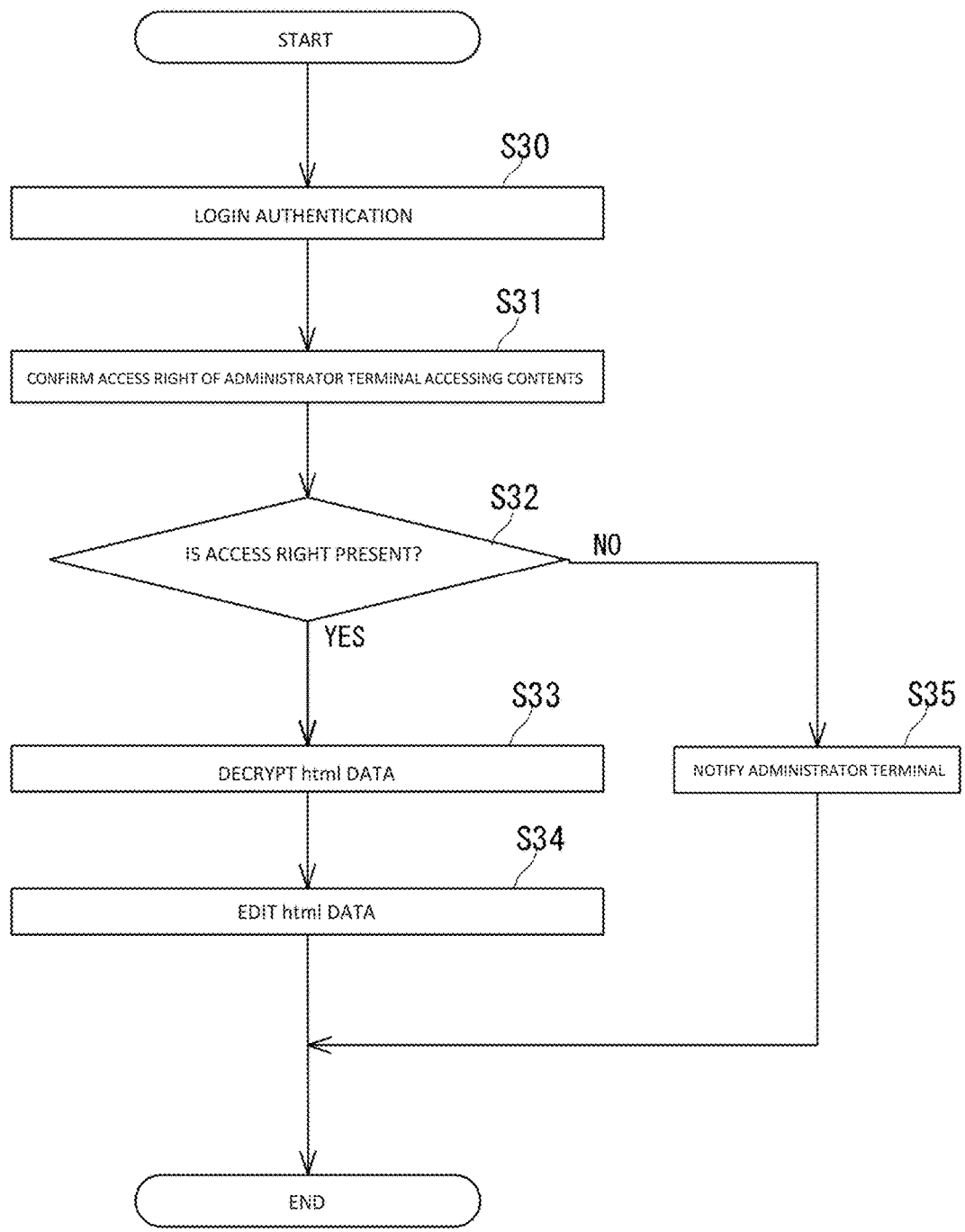
FIG. 11 is a flowchart showing an example of the information processing method according to the second embodiment.

Subsequently, a method of preventing tampering with the contents in the database 12 in advance will be described with reference to the flowchart of the information processing method according to the second embodiment shown in FIG. 11 (see FIG. 7 as appropriate).

The login authentication unit 21 receives the input of authentication information for login from the administrator terminal 13, and identifies the validity of access to the control device 11 (S30).

The access right check unit 26 determines whether or not the terminal has an access right to the contents on the basis of the set access right when the contents are accessed from the terminal (S31).

The access right check unit 26 decrypts the contents when the access right of the terminal to the contents is confirmed (S32: YES, S33). Then, the administrator edits and updates the contents via the administrator terminal 13 (S34). On the other hand, in a case where the terminal does not have the access right, the access to the contents is denied and the administrator terminal 13 is notified (S32: NO, S35). That is, even in a case of an unauthorized theft of the authentication information for login, the terminal not having the access right to the contents is denied access to the contents.

Thus, the contents managed by the information processing device 10 are encrypted and set so as to be decrypted and updated only by the administrator terminal 13 to which the right has been granted by the information processing device 10. This can prevent tampering with the contents in advance even when a third party intrudes into the information processing device 10, and can safely retain the contents.

It is to be noted that in the second embodiment, the control device 11 of the information processing device 10 is configured to set the access right for the administrator terminal 13 associated with the encrypted contents to decrypt and access the contents. However, the administrator terminal 13 that creates the contents may be configured to create association information in which the contents and the identification information of the administrator terminal 13 related to the creation of the contents are associated with each other, and set the access right for the administrator terminal 13 associated with the encrypted contents to decrypt and access the contents.

In a case where the plurality of administrator terminals 13 is associated with one content, when the content is updated, the control device 11 requests approval from all the administrator terminals 13, and when the approval is obtained, the contents in the database 12 may be updated.

Figure 12:
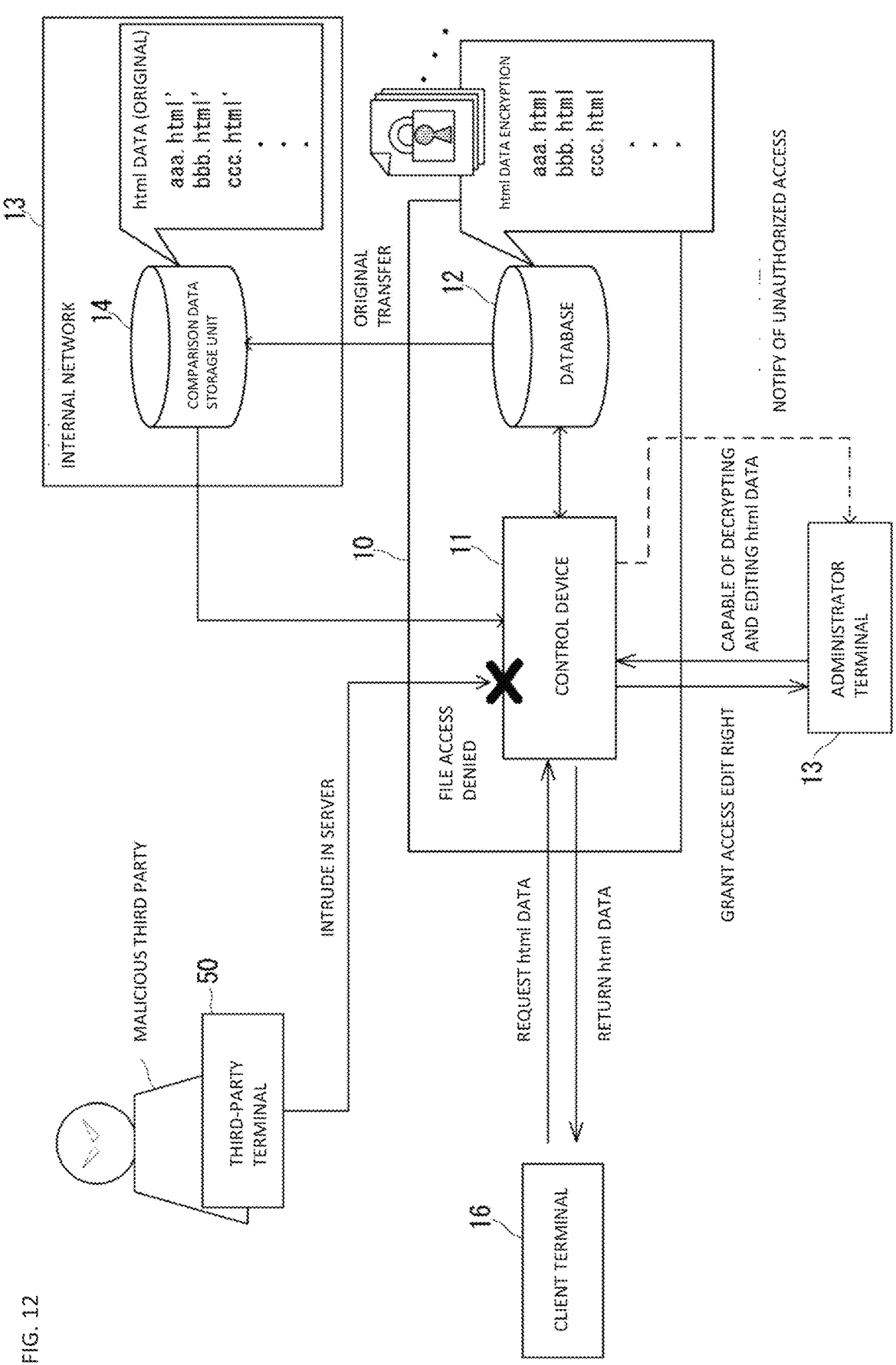
FIG. 12 is a configuration diagram showing a variation of the information processing device according to the second embodiment.

FIG. 12 is an explanatory view showing a variation of the information processing device 10 according to the second embodiment.

In this variation, the configuration shown in the first embodiment is added to the information processing device 10 according to the second embodiment.

Here, a case where a malicious third party uses a third-party terminal 50 to intrude into the information processing device 10 by unauthorized theft of a password or the like will be examined. The contents stored in the database 12 cannot be accessed from the third-party terminal 50 not having the access right. Therefore, the third-party terminal 50 cannot rewrite the contents and cannot tamper with them. Then, even in a case where the file has been rewritten, since the contents created or updated by the administrator terminal 13 are stored as comparison data in the comparison data storage unit 15, the tampering with the contents can be detected by comparing the contents in the database 12 with the comparison data.

Figure 13:
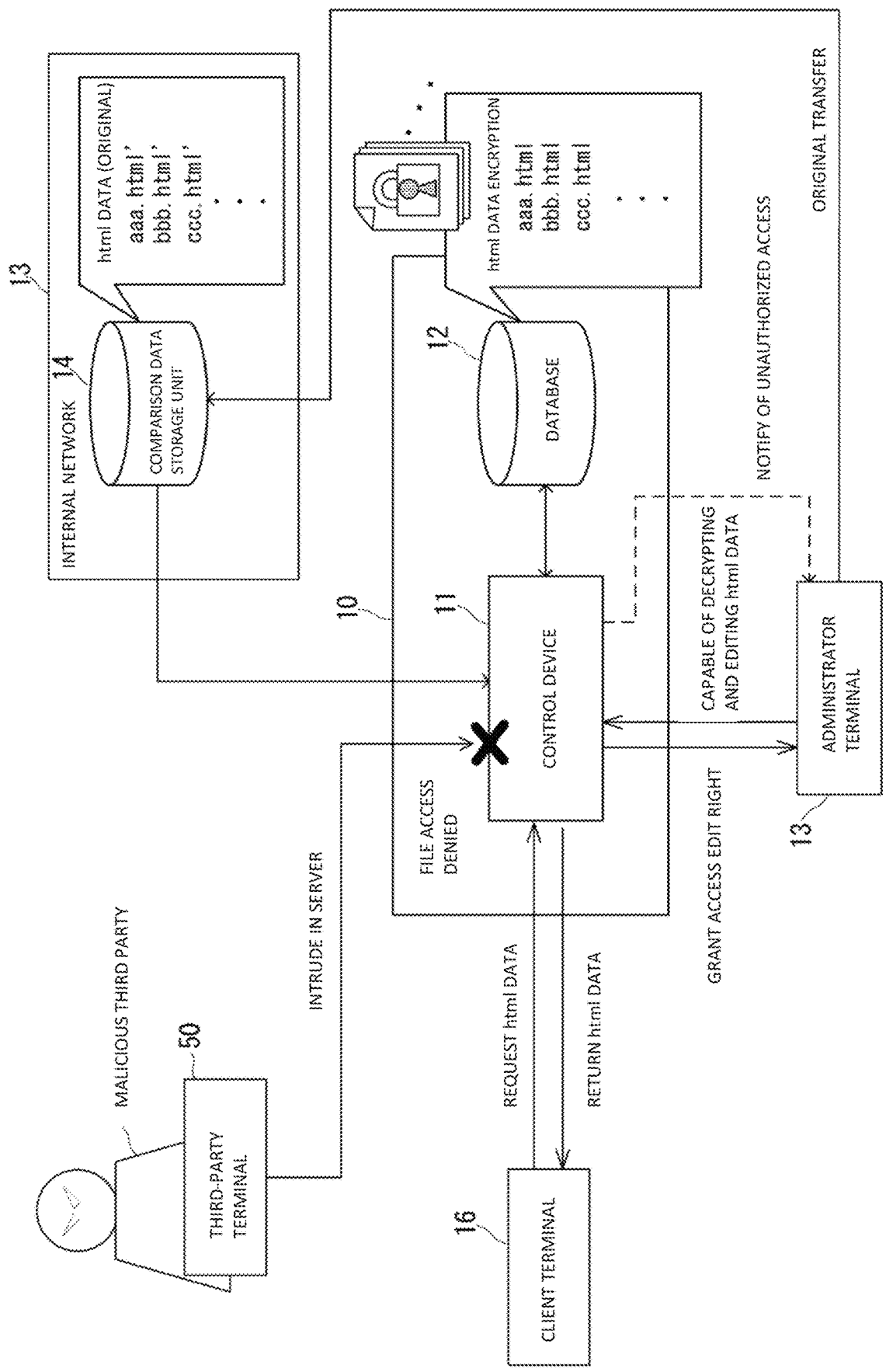
FIG. 13 is a configuration diagram showing a variation of the information processing device according to the second embodiment.

Furthermore, FIG. 13 is an explanatory view showing a variation of the information processing device 10 according to the second embodiment. In this variation, the comparison data (original data) created by the administrator terminal 13 is directly transferred to the comparison data storage unit 15. Similar to the variation shown in FIG. 12, even in a case where the file has been rewritten, tampering with the contents can be detected by comparing the contents in the database 12 with the comparison data. In addition, even if the administrator loses the administrator terminal 13 due to theft or the like, since the original data is retained, the detection of tampering with the contents can be continued.

According to the information processing device of each, of the above-described embodiments, the contents created by the administrator terminal are associated with the administrator terminal, whereby, even in a case where the web server is intruded by a third-party terminal, the tampering with the contents in the server can be detected at an early stage, and the tampering can be prevented in advance.

It is to be noted that the program to be executed by the control device 11 is provided in advance by being incorporated into a storage circuit such as a ROM. Alternatively, this program may be provided as an installable or executable file stored in a computer-readable storage medium such as a CD-ROM, CD-R, memory card, DVD, or flexible disk. The program to be executed by the control device 11 may be stored on a computer connected to a network such as the Internet, and may be provided by being downloaded via the network.

Although some embodiments of the present invention have been described, these embodiments are presented by way of example and are not intended to limit the scope of the invention. These novel embodiments can be implemented in various other forms, and various omissions, replacements, and changes can be made without departing from the scope of the invention. These embodiments and variations thereof are included in the scope and gist of the invention, and are also included in the scope of the invention described in the claims and the equivalent scope thereof.

REFERENCE SIGNS LIST

10 Information processing device
11 Control device (web server)
12 Database
13 Administrator terminal
14 Internal network
15 Comparison data storage unit
16 Client terminal
20 Data transmission/reception unit
21 Login authentication unit
22 Terminal association unit
23 Comparison data output unit
24 Comparison check unit
25 Access right setting unit
26 Access right check unit
50 Third-party terminal
100 Information processing system

The invention claimed is:

1. An information processing device that returns contents in response to a request from a client terminal, the information processing device comprising:
    a database that is configured to store the contents created by an administrator terminal; and
    a control device that is configured to store the contents and identification information for identifying the administrator terminal that are associated with each other as association information, and execute setting an access right to edit or delete the contents on a basis of the association information, wherein
    the control device comprising:
        an access right setting unit that is configured to encrypt the contents created by the administrator terminal, and set the access right to decrypt and to edit or delete the contents for the administrator terminal associated with the contents having been encrypted,
        an access right check unit that is configured to determine whether or not the administrator terminal has the access right to edit or delete the contents when the contents are accessed by the administrator terminal,
        a comparison data output unit that is configured to output data created or updated by the administrator terminal associated with the contents to a comparison data storage unit provided in an internal network as comparison data, and
        a comparison check unit that is configured to compare the contents stored in the database with the comparison data, and determine a presence or absence of tampering with the contents on a basis of a comparison result, and
    the control device is configured to decrypt and return the contents having been encrypted in response to the request from the client terminal.

2. The information processing device according to claim 1, wherein the access right is set for each file of the contents created by the administrator terminal or for each folder storing a file.

3. The information processing device according to claim 1, wherein the access right for one of the contents is set for a plurality of the administrator terminals,
    at a time of updating the contents, request for approval is notified to the administrator terminal, and
    the database is configured to update the contents when approved by each of the plurality of administrator terminals.

4. The information processing device according to claim 1, wherein the control device is configured to notify the administrator terminal when detecting at least one of tampering with the contents and accessing to the contents by a terminal different from the administrator terminal.

5. An information processing method that returns contents in response to a request from a client terminal, the information processing method comprising:
    storing the contents created by an administrator terminal;
    storing in a control device the contents and identification information for identifying the administrator terminal that are associated with each other as association information, and executing setting an access right to edit or delete the contents on a basis of the association information;
    encrypting the contents created by the administrator terminal, and setting the access right to decrypt and to edit or delete the contents for the administrator terminal associated with the contents having been encrypted;
    determining whether or not the administrator terminal has the access right to edit or delete the contents when the contents are accessed by the administrator terminal
    outputting data created or updated by the administrator terminal associated with the contents to a comparison data storage unit provided in an internal network as comparison data, and
    comparing the contents stored in the database with the comparison data, and determining a presence or absence of tampering with the contents on a basis of a comparison result, and
    wherein the control device is configured to decrypt and return the contents having been encrypted, in response to the request from the client terminal.

\* \* \* \* \*